United States Patent [19]

Heusler

[11] 4,337,689
[45] Jul. 6, 1982

[54] SAFETY SYSTEM FOR A DOUBLE ACTING SERVOMOTOR

[75] Inventor: Samuel Heusler, Winterthur, Switzerland

[73] Assignee: Sulzer Brothers Limited, Winterthur, Switzerland

[21] Appl. No.: 157,059

[22] Filed: Jun. 6, 1980

[30] Foreign Application Priority Data

Jun. 22, 1979 [CH] Switzerland .................. 5856/79

[51] Int. Cl.³ .................. F15B 13/042; F15B 13/043
[52] U.S. Cl. .................. 91/438; 91/437; 251/26
[58] Field of Search .................. 91/437, 438, 439; 251/26, 27

[56] References Cited

U.S. PATENT DOCUMENTS

| | | | |
|---|---|---|---|
| 2,219,967 | 10/1940 | Thiry | 91/437 |
| 3,127,688 | 4/1964 | Hein et al. | 91/437 X |
| 3,709,103 | 1/1973 | Dukhovny et al. | 91/437 |
| 3,757,646 | 9/1973 | Rohner | 91/437 X |
| 3,943,825 | 3/1976 | Bianchetta et al. | 91/438 |

FOREIGN PATENT DOCUMENTS 533245 3/1973 Switzerland .

*Primary Examiner*—Irwin C. Cohen

[57] ABSTRACT

The safety system employs a shut-off valve, a control valve and a selector. The selector is formed of two non-return valves which are connected to the two chambers of the servomotor and has an output connected to one chamber of the control valve. Another chamber of the control valve is connected to the low pressure chamber of the servomotor while the intermediate chamber is connected to the shut-off valve in order to influence the movements of the piston of the shut-off valve. A solenoid actuates the control valve to deliver either high pressure fluid from the high pressure servomotor chamber or low pressure fluid from the low pressure servomotor chamber to the shut-off valve.

4 Claims, 1 Drawing Figure

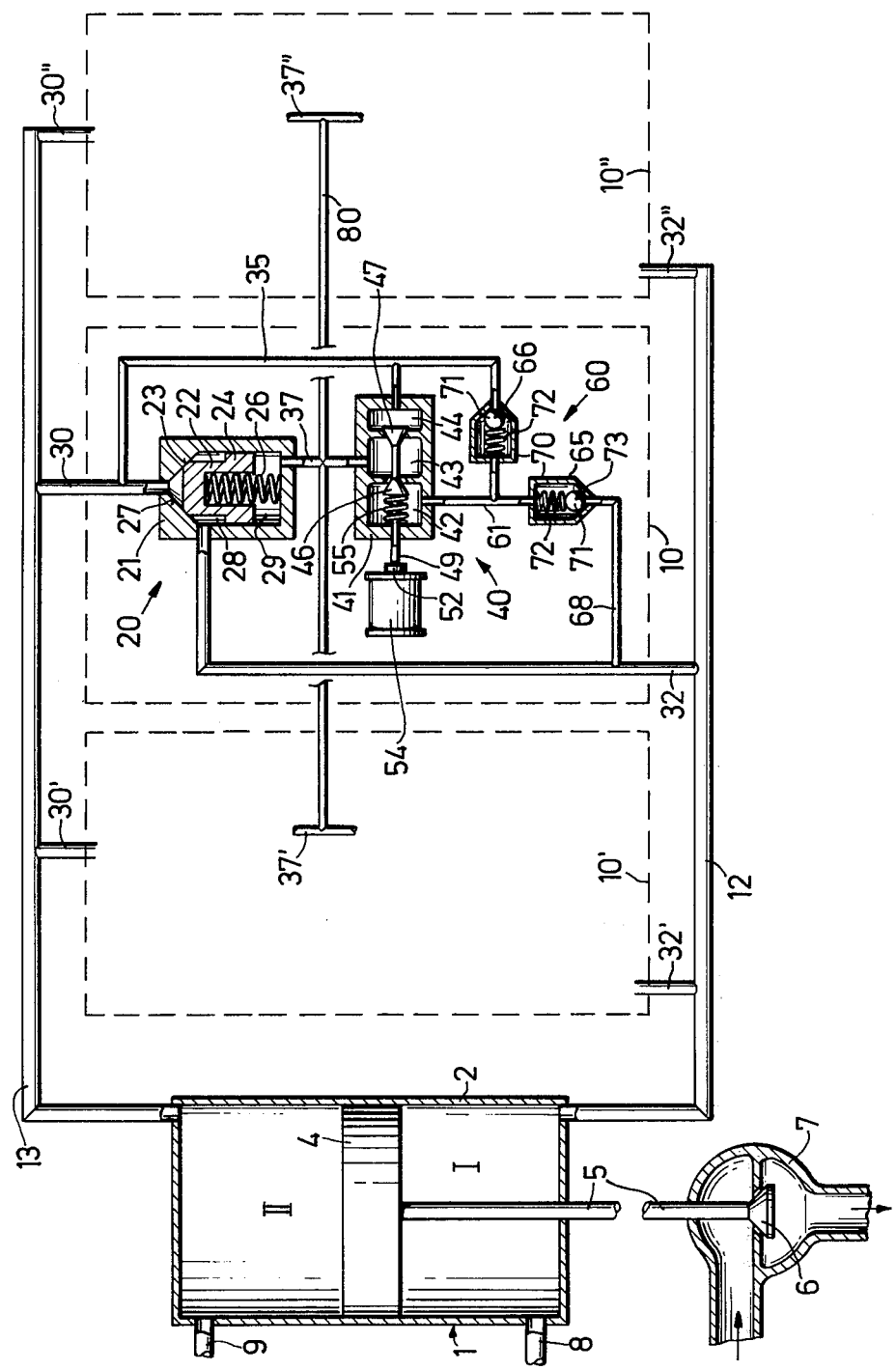

SAFETY SYSTEM FOR A DOUBLE ACTING SERVOMOTOR

This invention relates to a safety system for a double acting servomotor.

As is known, double acting servomotors have been used for various purposes, for example for opening and closing valves in steam circuits. In many cases, the servomotors have a reciprocal piston which is movable within a cylinder via a controller between a control position and a safety position. Generally, the piston is arranged to move into the safety position by restoring forces and/or by internal additional forces while being brought into the control position in normal operation by predominating fluid pressures controlled by the controller in two cylinder chambers of the servomotor.

In some cases, for example as described in Swiss Pat. No. 533,245, a safety system is provided to insure movement of the piston into the safety position when required. This known safety system employs a shut-off valve which is connected to the two cylinder chambers of the servomotor, a control valve which is connected via a duct to the shut-off valve and which connects the shut-off valve alternately to the output of a selector selecting the higher of two input pressures, or to a lower-pressure chamber. In this case, one of the selector inputs is connected to the servomotor cylinder chamber which reduces in size when the servomotor moves into the safety position.

Such safety systems, however, are relatively complex. Further, such safety systems require a connection to a separate control fluid source or sink.

Accordingly, it is an object of the invention to provide a simplified safety system for a double-acting servo-motor.

It is another object of the invention to provide a safety system for a double-acting servomotor which has a relatively high operational reliability.

It is another object of the invention to provide a safety system for a double-acting servomotor which does not require a connection to a separate control fluid source or sink.

Briefly, the invention provides a safety system for a double-acting servomotor having a piston which is disposed in a cylinder to divide the cylinder into a pair of chambers and which is movable between a control position and a safety position. In accordance with the invention, the safety system is comprised of a shut-off valve, a control valve and a selector.

The shut-off valve is connected between the chambers of the servomotor in order to control a flow of medium therebetween. To this end, the shut-off valve is operable between a closed position blocking communication between the chambers and an open position connecting the chambers to each other.

The control valve has a pair of inputs and an output. One input is connected to one of the servomotor chambers while the output is connected to the shut-off valve in order to switch the shut-off valve between the closed and open positions.

The selector has a pair of inputs each of which is connected to a respective servomotor chamber and an output which is connected to a selected one of the inputs for receiving the higher pressure medium from the servomotor chambers. This output is also connected to the second input of the control valve. When the control valve output is connected with this latter input, the shut-off valve is in the closed position. When the control valve output is connected with the other control valve input, the shut-off valve is in the open position.

In order to increase the operational reliability of the safety system, the shut-off valve is constructed with a valve disk connected to a spool in order to define chambers on opposite sides of the disk. Further, one of these chambers is connected to the two servomotor chambers on opposite sides of the disk and a connecting duct connects the cylinder chamber remote from the valve disk and swept by the spool with the output of the control valve.

In order to provide for redundancy, a plurality of safety systems are connected to the servomotor in parallel and a duct is connected in common to each output of the control valve of each system.

These and other objects and advantages of the invention will become more apparent from the following detailed description and appended claims taken in conjunction with the accompanying drawings in which:

The drawing illustrates a schematic diagram of a safety system for a double-acting servomotor in accordance with the invention.

Referring to the drawing, the double-acting servomotor 1 has a cylinder 2 and a piston 4 reciprocally movable therein in order to divide the cylinder 1 into a pair of chambers I, II. The piston 4 acts via a piston rod 5 on a valve disk 6, for example, of a steam by-pass valve 7 shown in a reduced scale and disposed, for example, in a by-pass conduit between a steam generator and a turbine of a steam power plant.

A controller (not shown) for moving the piston 4 is connected to the servomotor cylinder via ducts 8, 9 and controls the supply and/or discharge of a fluid medium, for example control oil, to the two cylinder chambers I, II, for example, so that during normal operation, a higher pressure prevails in chamber I than in chamber II.

A first distribution duct 12 is connected to the high pressure cylinder chamber 1 while a second distribution duct 13 is connected to the low pressure chamber II. In addition, three identical safety systems 10, 10', 10" are connected between the ducts 12, 13.

In the illustrated position, the servomotor piston 4 is movable towards the high pressure chamber I from a closed position into a safety position. When in the safety position, the piston 4 opens the valve 7 to a flow of steam.

Each safety system is connected to the chambers I, II for moving the servomotor piston into the safety position and each includes a shut-off valve 20, a control valve 40 and a selector 60.

The shut-off valve 20 is connected between the chambers I, II via the distribution ducts 12, 13 and ducts 32, 30 in order to control a flow of medium therebetween. The shut-off valve is operable between a closed position (as shown) blocking communication between the chambers I, II and an open position (not shown) connecting the chambers I, II to each other.

As shown, the shut-off valve 20 consists of a cylinder 21 in which a piston 22 is slidable. The piston 22 is formed as a valve disk 23 with a spool 24 connected thereto. This piston 22 is biased by a compression spring 26 so that the valve disk 23 is pressed against a seat formed by a conical surface 27 of the cylinder 21. As shown, the valve disk 23 and spool 24 define an annular chamber 28 which communicates with the duct 32 leading to the distribution duct 12. A control chamber 29 is formed on the opposite side of the disk 23 within which the spring 26 is housed. The duct 30 is provided at the end of the valve disk 23 in order to connect the valve 20 to the duct 13.

The control valve 40 has a pair of inputs, an output connected to the shut-off valve 20 via a duct 37 and valve means for selectively connecting a selected one of the inputs to the output. As shown, one of the inputs is connected via a duct 35 to the duct 30 and, thus, to the low pressure chamber II in order to receive medium at low pressure from the chamber II. The other input is connected to the selector 60 as described below.

As shown, the control valve 40 consists of a housing 41 having three chambers 42, 43, 44 which are separated by partitions. One outer chamber 42 communicates with the input of the control valve 40 connected to the selector 60, while the other outer chamber 44 communicates with the input of the control valve 40 connected to the duct 35. The intermediate chamber 43 communicates with the output of the control valve 40.

The valve means for selectively connecting a selected one of the control valve inputs to the output is in the form of a rod 49 which extends through the housing 41 and carries conical valve disks 46, 47 for seating on associated valve seats disposed in opposition to one another in the partitions between the chambers 42, 43, 44. In addition, the rod 49 carries an armature 52 which is movable into a solenoid 54. A spring 55 is also disposed between the disk 46 and the wall of the housing 41 adjacent the solenoid 54. When the solenoid 54 is non-energized, the spring 55 moves the rod 49 to the right, as viewed, so that the disk 47 opens communication between the chambers 43 and 44 while the disk 46 closes the opening between the chambers 42 and 43. When energized, the solenoid 54 moves the rod 49 into the position shown so that the chambers 42 and 43 are in communication while the chamber 44 is shut-off from the chamber 43.

The selector 60 has a pair of inputs formed by non-return valves 65, 66, respectively, and an output formed by a branched duct 61 connected to the valves 65, 66. As shown, one valve 65 has an inlet which is connected via a duct 68 to the duct 32 while the other valve 66 has an inlet connected to the duct 35.

Each non-return valve 65, 66 comprises a housing 70 and a ball 71 which is pressed against a valve seat 73 of the housing 70 by means of a spring 72.

As viewed, when the system is in normal operation, the servomotor 1 is fully controlled by the controller (not shown). At the same time, the solenoid 54 of each safety system 10, 10', 10'' is energized so that the armature 52 is attracted and the valve disks 46, 47 are in the positions illustrated. The chamber 29 beneath the piston 22 thus receives the higher pressure in cylinder chamber I because of the selective effect of the two non-return valves 65, 66 of the selector 60. Since the force of the compression spring 26 outweighs the friction and the weight of the piston 22, and since the forces acting on the top of the piston 22 are less than those acting on the bottom, the valve 20 is closed. At this time, the chamber 44 of the control valve communicates via the ducts 35, 30, 13 with the low pressure chamber II while the chamber 42 communicates via the non-return valve 65 and ducts 68, 32, 12 with the high pressure chamber I. At the same time, the annular chamber 28 of the shut-off valve communicates via the ducts 32, 12 with the high pressure chamber I.

If a safety signal occurs in the event of an absence of voltage at the solenoid 54, the rod 49 moves to the right, as viewed. Thus, communication between the chambers 42, 43 is blocked while communication is open between the chambers 44, 43. The chamber 29 beneath the piston 22 of the shut-off valve 20 is then connected to the cylinder chamber II via the ducts 37, 35, 30, 13. Since the pressure in the chamber II is lower than in chamber I, the annular surface of the piston 22 facing the annular chamber 28 is subject to a higher pressure than the surface facing the chamber 29. This differential pressure overcomes the force of the spring 26 and causes the piston 22 to move downwardly, as viewed, to open the valve 20. Thus, the distribution ducts 12, 13, and hence the cylinder chambers I, II, are connected to each other via the ducts 32, 30. The restoring forces acting on the valve disk 6 then cause the servomotor to move rapidly into the safety position in which the valve 7 fully opens.

If a plurality of safety systems 10, 10', 10'' are provided for redundancy reasons, there is a very great probability that all of the shut-off valves, for example, three, will open in the event that a safety signal occurs, for example in the absence of a voltage at the solenoid 54. In order to improve the operational reliability, the safety systems are connected in parallel and a transverse duct 80 is connected in common to each output, i.e. the duct 37, of the respective control valves 40. Thus, all three valves open if one or even two of the control means do not respond to the safety signal.

It is to be noted that the individual components of the system may be constructed in an appropriate manner. It may also be advantageous to provide a throttle in the duct 61 leading from the output of the selector 60 to the chamber 42 of the control valve 40.

The manner in which the shut-off valve 20 is closed, i.e. the duct 30 being connected to the end of the disk 23 while the duct 32 is connected to the annular chamber 28 has advantages in respect of leakage since both sides of the spool 24 are at the same pressure during normal operation.

The annular surface of the piston 22 facing the annular chamber 28 is an important factor and is preferably about one third of the total piston area.

It may also be advantageous to provide the shut-off valve 20 with an external adjustable stroke limiting means.

The invention thus provides a safety system for a double acting servomotor which does not require a separate control fluid source or sink. Instead, the control fluid used by the safety system is self-contained within the circuit of the safety system and the safety system operates under the influence of the pressure differential existing between the servomotor chambers.

What is claimed is:

1. A safety system for a double-acting servomotor having a cylinder and a piston disposed in the cylinder to divide the cylinder into a pair of chambers while being movable between a control position and a safety position; said safety system comprising
   a pressure responsive shut-off valve connected between said chambers to control a flow of medium therebetween, said shut-off valve being operable between a closed position blocking communication between said chambers and an open position connecting said chambers to each other, said shut-off valve including a housing, a spool having a valve disk connected thereto to define a chamber in said housing on on each side of said disk which communicate with one another when said valve disk is in said open position and a valve control chamber on the side of said spool which is remote from said valve disk, one of said two valve chambers being connected on one side on said disk to said one servomotor chamber and on another side of said disk to said other servomotor chamber;

a control valve having a pair of inputs and an output, one of said inputs being connected to one of said chambers which is increasing when the piston moves into the safety position and said output being connected to said valve control chamber of said shut-off valve to switch said shut-off valve between said positions thereof; and a pressure responsive selector having a pair of inputs and an output, one of said selector inputs being connected to one of said chambers which is decreasing when the piston moves into the safety position, the second of said selector inputs being connected to said one chamber and said selector output being connected to a selected one of said selector inputs which is connected to the other of said chambers and receiving pressure medium from this servomotor chamber and to the other of said inputs of said control valve whereby with said control valve output connected with said other input of said control valve, said shut-off valve is in said closed position and with said control valve output connected with said one input of said control valve, said shut-off valve is in said open position.

2. In combination a double-acting servomotor having a high pressure chamber, a low-pressure chamber and a piston separating said chambers, said piston being movable towards said high pressure chamber from a closed position into a safety position;

a safety system connected to said chambers for moving said piston into said safety position, said system comprising a pressure responsive shut-off valve connected between said chambers to control a flow of medium therebetween, said shut-off valve being operable between a closed position blocking communication between said chambers and an open position connecting said chambers to each other;

a control valve having a pair of inputs and an output for controlling said pressure responsive shut-off valve, one of said inputs being connected to one of said chambers and said output being connected to said shut-off valve to switch said shut-off valve between said positions thereof; and a pressure responsive selector having a pair of inputs and an output, one of said selector inputs being connected to the other of said chambers, the second of said selector inputs being connected to said one chamber and said selector output being connected to a selected one of said selector inputs receiving the high pressure medium from said servomotor chambers and to the other of said inputs of said control valve whereby with said control valve output connected with said other input of said control valve, said control valve output communicates with said other chamber to hold said shut-off valve is in said closed position and with said control valve output connected with said one input of said control valve, said control valve output communicates with said one chamber to switch said shut-off valve to said open position.

3. The combination as set forth in claim 2 comprising a plurality of said safety systems connected in parallel to said servomotor chambers, and a duct connected in common to each said output of said control valves.

4. In combination a double-acting servomotor having a high pressure chamber, a low-pressure chamber and a piston separating said chambers, said piston being movable towards said high pressure chamber from a closing position into a safety position;

a safety system connected to said chambers for moving said piston into said safety position, said system comprising a pressure responsive shut-off valve connected between said chambers to control a flow of medium therebetween, said shut-off valve having a piston movable between a closed position blocking communication between said chambers and an open position connecting said chambers to each other;

a control valve having a pair of inputs, an output connected to said shut-off valve for controlling said pressure responsive shut-off valve and valve means for selectively connecting a selected one of said inputs to said output, one of said inputs being connected to said low pressure chamber to receive medium at low pressure from said low pressure chamber; and a pressure responsive selector having a pair of inputs and an output, one of said selector inputs being connected to said high pressure chamber, the other of said selector inputs being connected to said low pressure chamber and said output being connected to the second of said inputs of said control valve to deliver medium at high pressure to said second input of said control valve;

whereby with said second input of said control valve connected to said output thereof, said control valve output communicates with said high pressure chamber to hold said shut-off valve piston in said closed position and with said one input of said control valve connected to said output thereof, said control valve output communicates with said low pressure chamber to allow said shut-off valve piston to move to said open position to connect said servomotor chambers together to move said servomotor piston into said safety position.

* * * * *